United States Patent [19]

Guenther

[11] Patent Number: 5,404,639

[45] Date of Patent: Apr. 11, 1995

[54] COMPOSITE INSULATION FOR ENGINE COMPONENTS

[75] Inventor: William D. Guenther, Hagerstown, Ind.

[73] Assignee: Dana Corporation, Toledo, Ohio

[21] Appl. No.: 271,322

[22] Filed: Jul. 6, 1994

Related U.S. Application Data

[63] Continuation of Ser. No. 126,008, Sep. 24, 1993, which is a continuation of Ser. No. 999,188, Dec. 23, 1992, abandoned, which is a continuation of Ser. No. 814,214, Dec. 19, 1991, abandoned, which is a continuation of Ser. No. 363,320, Jun. 7, 1989, abandoned, which is a continuation of Ser. No. 551,743, Jan. 12, 1984, abandoned, which is a continuation of Ser. No. 230,387, Feb. 2, 1981, abandoned, which is a continuation-in-part of Ser. No. 165,625, Jul. 2, 1980, abandoned.

[51] Int. Cl.⁶ .......................... F02F 3/10; B22D 19/16
[52] U.S. Cl. .................. 29/888.061; 123/669; 228/178; 428/608
[58] Field of Search .......................... 92/222, 223, 224; 123/193.6, 668, 669; 428/241 R, 608, 614; 29/527.2, 527.3, 888.061, 888.06; 228/178

[56] References Cited

U.S. PATENT DOCUMENTS

| | | |
|---|---|---|
| 1,243,654 | 10/1917 | Clark . |
| 1,462,655 | 7/1923 | Philip . |
| 1,500,853 | 7/1924 | Short . |
| 1,508,099 | 9/1924 | Hawley, Jr. . |
| 1,568,835 | 1/1926 | Hawley, Jr. . |
| 1,857,077 | 5/1932 | Adamson . |
| 2,059,713 | 11/1936 | Schneider . |
| 2,075,388 | 3/1937 | De Cloud ............................ 92/223 |
| 2,455,804 | 12/1948 | Ransley et al. . |
| 2,466,890 | 4/1949 | Gilbertson . |
| 2,478,294 | 8/1949 | Madsen . |
| 2,657,961 | 11/1953 | Von Lassberg . |
| 2,924,004 | 2/1960 | Wehrmann et al. . |
| 3,017,492 | 1/1962 | Jepson . |
| 3,098,723 | 7/1963 | Micks . |
| 3,149,409 | 9/1964 | Maruhn . |
| 3,153,279 | 10/1964 | Chessin . |
| 3,156,040 | 11/1964 | Drexhage . |
| 3,157,722 | 11/1964 | Moore . |
| 3,161,478 | 12/1964 | Chessin . |
| 3,203,321 | 8/1965 | Rosen . |
| 3,257,803 | 6/1966 | Reid . |
| 3,427,185 | 2/1969 | Cheatham et al. . |
| 3,469,297 | 9/1969 | Webber . |

(List continued on next page.)

FOREIGN PATENT DOCUMENTS

| | | |
|---|---|---|
| 987219 | 4/1976 | Canada . |
| 861172 | 12/1952 | Germany . |
| 51-80133 | 7/1976 | Japan . |
| 52-34308 | 3/1977 | Japan . |

(List continued on next page.)

OTHER PUBLICATIONS

"Thermal Coating Steps Up Engine Performance" Design News, p. 123 (Sep. 1979).

*Primary Examiner*—Stephen M. Hepperle
*Attorney, Agent, or Firm*—MacMillan, Sobanski & Todd

[57] ABSTRACT

Engine components are thermally insulated with composite layers for improved engine efficiency. A metallic insulation layer is affixed to the metallic substrate of each component, and a layer of heat and corrosion resistant metal overlies and is bonded to the insulation layer. One preferred embodiment incorporates a preformed sheet layer of stainless steel sintered to a layer of metallic insulation attached to the component body substrate. An alternate embodiment incorporates a plasma-sprayed stainless steel layer over the insulation layer. A preferred process for making the engine component includes casting the component body in a mold containing a preformed insulation composite formed of a layer of stainless steel sheet sintered to a layer of metallic insulation.

6 Claims, 2 Drawing Sheets

U.S. PATENT DOCUMENTS

| | | | |
|---|---|---|---|
| 3,480,465 | 11/1969 | Imabayashi et al. | |
| 3,505,038 | 4/1970 | Luksch et al. | |
| 3,547,180 | 12/1970 | Cochran et al. | |
| 3,596,344 | 8/1971 | Kreider. | |
| 3,606,667 | 9/1971 | Kreider. | |
| 3,615,277 | 10/1971 | Kreider et al. | |
| 3,638,299 | 2/1972 | Garner et al. | |
| 3,663,356 | 5/1972 | Li. | |
| 3,792,726 | 2/1974 | Sakai et al. | |
| 3,840,350 | 10/1974 | Tucker, Jr. | |
| 3,841,386 | 10/1974 | Niimi et al. | |
| 3,844,727 | 10/1974 | Copley et al. | |
| 3,844,728 | 10/1974 | Copley et al. | |
| 3,849,080 | 11/1974 | Zechmeister. | |
| 3,876,389 | 4/1975 | Chaudhari et al. | |
| 3,888,296 | 6/1975 | Vernia et al. | |
| 3,889,348 | 6/1975 | Lemelson. | |
| 3,890,690 | 6/1975 | Li. | |
| 3,896,626 | 7/1975 | Spies et al. | |
| 3,897,624 | 8/1975 | Hamano. | |
| 3,900,626 | 8/1975 | Brennan. | |
| 3,902,864 | 9/1975 | Nix et al. | |
| 3,911,891 | 10/1975 | Dowell. | |
| 3,914,500 | 10/1975 | Brennan et al. | |
| 3,920,360 | 11/1975 | Bierlein | 29/527.3 X |
| 3,936,277 | 2/1976 | Jakway et al. | |
| 3,937,266 | 2/1976 | Cordone et al. | 29/527.3 |
| 3,949,552 | 4/1976 | Kaneko et al. | |
| 3,953,647 | 4/1976 | Brennan et al. | |
| 3,994,428 | 11/1976 | Li. | |
| 4,050,244 | 9/1977 | Morikawa et al. | |
| 4,075,364 | 2/1978 | Panzera. | |
| 4,077,637 | 3/1978 | Hyde et al. | |
| 4,091,061 | 5/1978 | Turbier et al. | |
| 4,142,022 | 2/1979 | Erickson et al. | 428/432 |
| 4,167,207 | 9/1979 | Rao et al. | |
| 4,242,948 | 1/1981 | Stang et al. | |
| 4,245,611 | 1/1981 | Mitchell et al. | 123/193 P |
| 4,254,621 | 3/1981 | Nagumo | 60/282 |
| 4,273,824 | 6/1981 | McComas et al. | 428/661 |
| 4,318,438 | 3/1982 | Ban et al. | 164/97 |
| 4,334,507 | 6/1982 | Köhnert et al. | 123/193 |
| 4,338,380 | 7/1982 | Erickson et al. | 428/594 |
| 4,404,262 | 9/1983 | Watmough | 428/539.5 |
| 4,830,932 | 5/1989 | Donomoto et al. | |

FOREIGN PATENT DOCUMENTS

| | | | |
|---|---|---|---|
| 539568 | 9/1941 | United Kingdom. | |
| 940888 | 11/1963 | United Kingdom. | |
| 1560311 | 2/1980 | United Kingdom | 123/193 X |

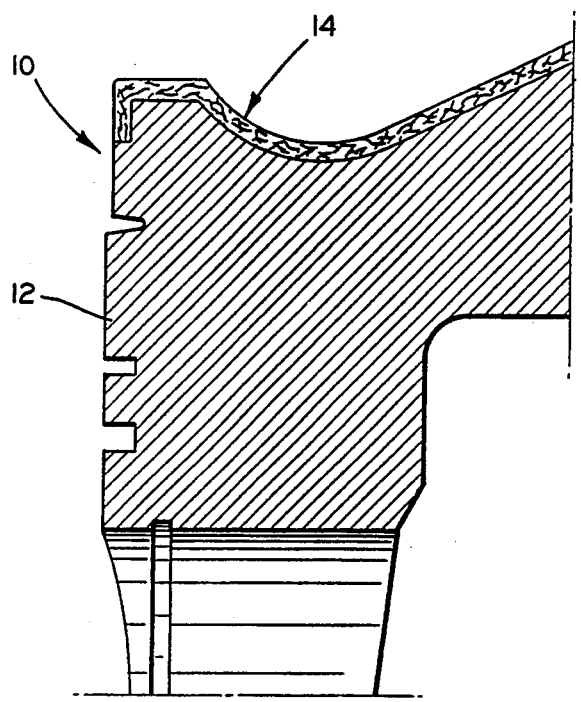
FIG. 1-A
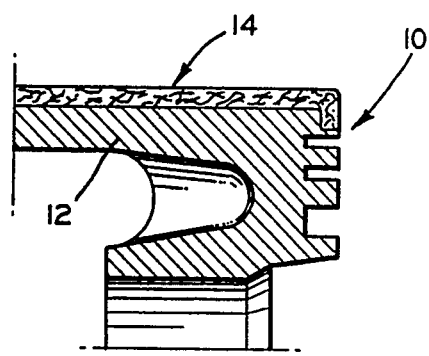
FIG. 1-B
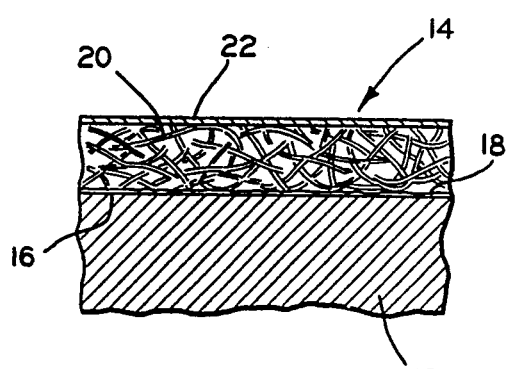
FIG. 2
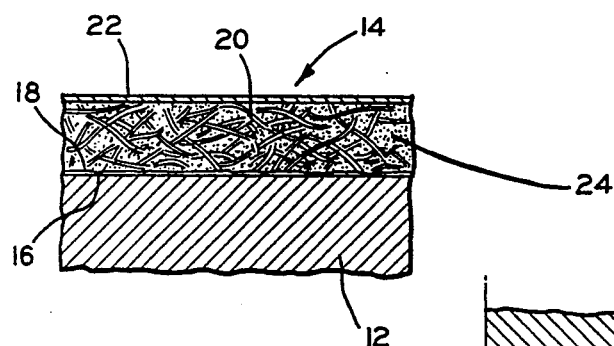
FIG. 3
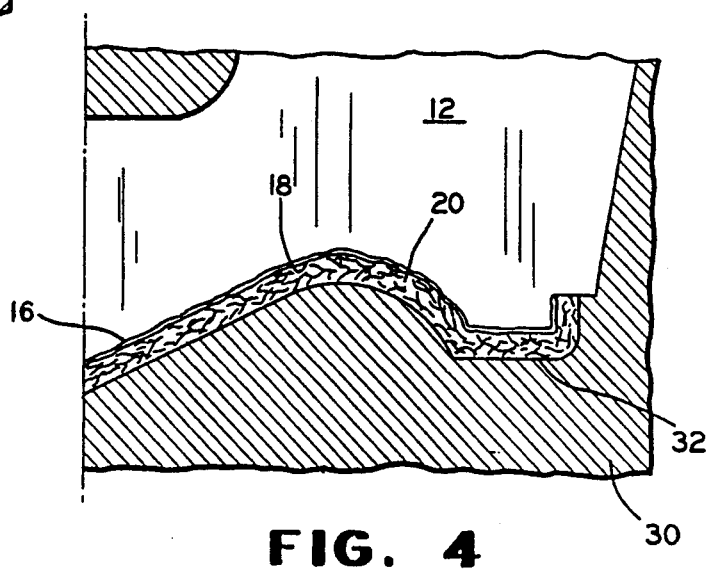
FIG. 4

COMPOSITE INSULATION FOR ENGINE COMPONENTS

RELATED OF INVENTION

This application is a continuation of Ser. No. 08/126,008, filed Sep. 24, 1993, which was a continuation of Ser. No. 07/999,188, filed Dec. 23, 1992, (now abandoned), which was a continuation of Ser. No. 07/814,214, filed Dec. 19, 1991, (now abandoned), which was a continuation of Ser. No. 07/363,320, filed Jun. 7, 1989, (now abandoned), which was a continuation of Ser. No. 06/551,743, filed Jan. 12, 1984, (now abandoned), which was a continuation of Ser. No. 06/230,387, filed Feb. 2, 1981, (now abandoned), which was a continuation-in-part of Ser. No. 06/165,625, filed Jul. 2, 1980, (now abandoned).

BACKGROUND OF INVENTION

This invention relates generally to insulation of engine components and more particularly to composite layered insulation for pistons, cylinder heads, and valves. Many modern insulation composites include pure ceramic layers employed in combination with adjoining layers of thermally insulative materials, particularly layers of metallic insulation. The ceramic layers thus utilized have been applied to the latter metallic layers by electrostatic deposition techniques, particularly, and more popularly, via plasma spray. A principal drawback of prior art ceramics as utilized with metallic layers has been the difficulty of adherence of ceramics to metallic materials. In fact, many of the failures of ceramic are attributable to the bonding agents employed to create durable adherence of ceramic to metal, the bonding agents being required chiefly as result of the large differences in thermal expansion coefficients of ceramics relative to metals. Another drawback, relating to the inherently brittle nature of ceramic materials, is that ceramic layers have a tendency to crack and flake away when used in high stress situations, such as those encountered in internal combustion engines.

SUMMARY OF INVENTION

The insulation composites disclosed herein do not employ pure ceramic layers and thus are not susceptible to the flaking and cracking problems attributable to engine composites containing such layers. Instead of ceramic, a heat and corrosion resistant metal, preferably stainless steel, is employed, which may be either a preformed sheet or electrostatically deposited to form a layer that is impervious to combustion gases and particulates. The adhesion of a metal layer to metallic insulation is superior to that of ceramic by virtue of achievement of a metal to metal bond. In a preferred embodiment, the body of an engine component constructed in accordance with the subject invention is formed of a metallic base metal, as, for example, aluminum alloy. A thermally insulative metallic layer is bonded to the base or substrate metal of the component, preferably by a solder alloy. The exposed insulative metallic layer is then covered with a heat and corrosion resistant metal such as stainless steel sheet or an electro-deposited layer to form the completed composite. A preferred method of making cast components having a composite layer includes casting the component in a mold containing a preformed metallic insulation layer, the layer having been pre-treated with solder alloy. The engine component, which includes the metallic insulation layer, is next removed from the mold, and the exposed portion of the metallic insulation layer is then covered with stainless steel. Alternatively, the heat and corrosion resistant layer may be first sintered to the mesh layer to form a composite, which is then placed into the mold. Molten metal is next poured thereover to form an insulated component. A second preferred method involves already fabricated engine components, either forged or cast, wherein an insulated composite is bonded directly to the finished component, for example, via solder alloy or rubber base adhesive.

BRIEF DESCRIPTION OF THE DRAWINGS

FIGS. 1A and 1B are cross-sectional views of aluminum pistons as utilized in heavy duty diesel and lighter duty gasoline engine cycles, respectively, each incorporating the thermally insulated head of this invention.

FIG. 2 is an enlarged cross-sectional detailed view of the thermally insulative layer of this invention.

FIG. 3 is an enlarged cross-sectional detailed view of an alternate embodiment of the thermally insulative layer of this invention.

FIG. 4 is a fragmented cross-sectional view of a piston mold apparatus, which may be employed to carry out a preferred process of making a piston in accordance with this invention.

DETAILED DESCRIPTION OF PREFERRED EMBODIMENTS

Figure 5:
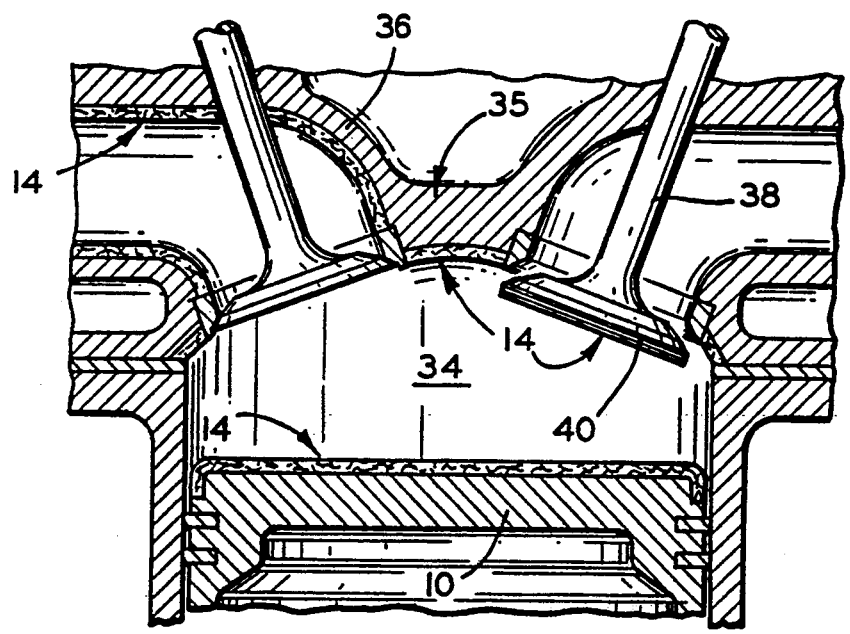
FIG. 5 is a cross-sectional fragmentary view of a cylinder head as an example of an engine component which incorporates the composite insulation layer of this invention.

Although the invention disclosed herein is suitable for numerous engine components generally, one preferred embodiment of its use involves piston head construction. The invention is amenable to both diesel and conventional gasoline internal combustion engines, and FIGS. 1A and 1B depict its incorporation in pistons 10 of both types of engines, respectively. Such engines are known to become more efficient as piston head skin temperatures become higher. Ideally, adiabatic conditions would exist, under which there would be no cooling of the piston substrate metal body 12. As existing metallurgical limits do not allow the ideal, a thermally insulative piston head composite 14 is utilized which will permit considerably higher head skin temperatures than conventionally practical, yet the piston body can be cooled as under normal practice.

FIG. 2 is a detailed view of the insulative composite 14 employed therein. The piston substrate metal body 12, preferably of an aluminum alloy, has a piston head substrate surface 16 coated with a layer of solder alloy 18. The layer of solder alloy 18 acts as a bonding agent, and thus prepares the piston head substrate surface 16 for receipt of a metallic mesh layer 20, which is then bonded thereto. A layer of stainless steel 22 is next applied to the exposed area of the mesh layer 20 by plasma spray deposition of stainless steel to the mesh layer 20. As an alternate to the use of plasma-spray or other electrostatic deposition techniques, a preformed stainless steel sheet layer may be fused with the mesh layer 20 to form an integral composite 14 for bonding directly to the substrate surface 16. The latter sheet and mesh layers are preferably sintered together in an inert environment at approximately 2100° F. The completed composite is preferably bonded to the substrate surface 16 via solder alloy as heretofore described.

To ensure the integrity of the composite 14, and hence the long-term ability of the composite 14 to withstand higher temperatures without disentegration, the layer 22 should completely cover and enclose all exposed areas of the mesh layer 20, even over the periphery thereof down to the line of the substrate surface 16. The mesh layer 20 should be rendered totally impervious to combustion gases and particulates of combustion in order to function as intended.

The mesh layer 20 is preferably comprised of a randomly oriented, interlocked structure of sintered metal fibers. The fibers are sintered to produce metallic bonds at all points wherein the individual fibers contact one another.

FIG. 3 depicts an alternate embodiment of the thermally insulative composite 14, wherein the metallic mesh layer 20 contains an impregnated ceramic material 24. The material 24 is preferably a high temperature ceramic adhesive, Such as Aremco 552 Ultra Bond* adhesive, which acts as a reinforcement filler to ensure an insulative effect even when the stainless steel layer 22 is partially damaged and/or does not otherwise fully cover the mesh layer 20 (thus permitting some entrainment of combustion gases and particulates). Without the material 24, the mesh layer 20 is normally entrained with air, which of course will only provide good insulative effect if absolutely trapped.

Two preferred methods of making the piston of this invention are now described as follows. Included in the descriptions are specific parameters of the thermally insulative layer 14 of the present invention, including preferred materials, temperatures, and thicknesses.

According to the first method, the piston head surface 16 (FIG. 2) of the piston substrate metal body 12 is tinned with a layer of solder alloy 18, preferably with Alcoa 805* zinc solder alloy (95% zinc, 5% aluminum). A preformed metallic mesh layer 20 is then also tinned with the same solder alloy. The penetration of the mesh layer 20 by solder alloy must be of sufficient depth to achieve a strong mechanical bond, yet not of a depth as to substantially reduce the insulation property of the mesh. As mentioned earlier, flux may be utilized in the application of the solder, or the tinning may be fluxless, as in an atmospherically controlled furnace. A suggested flux is Alcoa 66-A*, solder flux.

Next, the tinned mesh layer 20 is placed atop the piston head substrate surface 16, and a metal plate (not shown), preferably of steel, is placed on top of the assembly. The plate acts as a heat sink, as well as a weight for assuring a firm contact between the mesh layer 20 and the piston head substrate surface 16. The piston and top plate are heated to approximately 760° to 780° F. Pressure (10-20 psi) may be added to the weight of the top plate as flux begins to burn away and, as the solder begins to melt, to assure aforesaid firm contact.

The piston is then allowed to cool until the solder solidifies. The top plate is next removed after solidification of the solder. Flux residues are further removed; hot water rinsing is suitable for this purpose. Next, the mesh layer 20 may be impregnated with a high temperature ceramic adhesive, as aforementioned. The adhesive is preferably applied at room temperatures as either a paste or slurry, under pressures ranging from 500 to 1000 pounds per square inch. The adhesive is then air dried for approximately 8 hours, and cured within a temperature range of 300 to 700 degrees Fahrenheit for approximately one-half to two hours. As earlier mentioned, a preferred ceramic adhesive for this purpose is Aremco 552 Ultra Bond* Adhesive. If ceramic impregnation is employed, the ceramic-filled mesh layer 20 is next grit blasted to expose the wire mesh. Finally, a stainless steel layer 22 is applied to the mesh layer 20, by plasma spray.

By way of specific example, two embodiments of the piston of this invention were fabricated in accordance with this method. The first incorporated a plasma-sprayed stainless steel layer 22 which was formed of Metco 41-C* powder stainless steel. After a finish machining operation, the layer 22 was approximately 0.015-0.020 inch. The second incorporated a preformed stainless steel sheet, in which the layer 22 was formed of a 0.020-0.025 inch thick sheet of an AISI 304 stainless steel stock and was sintered directly onto the mesh layer 20. In both instances, the mesh layer 20 was 0.040 inch thick Technetics FM-134* wire mesh, having a metal to air density of 65%, an ASTM mesh of 18, and formed of AISI C-14 wire.

II

In accordance with the second preferred method, a piston mold 30 is used, as fragmentarily shown in FIG. 4. The mold acommodates an "upset" piston casting technique, in which the piston is cast in an inverted position.

First, a preformed metallic mesh layer 20 is tinned with solder alloy, as in the example heretofore described. The mesh layer 20 is then placed into the bottom 32 of the piston mold 30 with the tinned side thereof upwardly facing. The bottom 32 of the piston mold 30 is preferably heated in order to bring the temperature of the mesh layer 20 up to 600 to 650° F. prior to casting. Two advantages support this Preference: (1) minimization or elimination of warpage of the mesh layer 20, which is incurred as a result of the molten aluminum contacting the otherwise relatively low temperature mesh layer, and (2) measurable improvement in bond strength due to the more complete melting and alloying of the solder alloy. A risk of not heating the mold is that the molten aluminum will chill and solidify against cold surfaces, and thus may not melt all of the alloy. Highly magnified photographs of the resulting interface between the mesh layer 20 and cast aluminum body of the piston 10 indicate that the bond formed body of the piston 10 indicate that the bond formed therebetween is of a mechanical nature, with only aluminum at the interface. There appears to be only minute traces of zinc, which suggests that the zinc of the 95% zinc solder alloy operates only as a vehicle for carrying aluminum into the interstices of the mesh interface, and then travels out of the zone of the bond and into the-gates and/or risers of the mold.

After the piston is cast over the mesh layer 20, it is allowed to cool, then removed from the mold. The piston is then preturned to remove all aluminum metal from the sides of the mesh layer 20. At this point, the mesh layer may be impregnated with ceramic adhesive. Finally, the stainless steel layer 22 is applied by plasma spray.

Alternately, a preformed stainless steel sheet may be first sintered to the wire mesh 20. The resulting composite is then tinned on the mesh side thereof, and placed into the mold 30 with the tinned side up. The piston body is then cast over the composite, and the same steps follow as before.

As mentioned initially, the invention disclosed herein is suitable for application to numerous engine components. A second preferred application thereof relates to cylinder heads, with particular emphasis on combustion chamber, exhaust port, and intake valve areas. (Although not illustrated, cylinder bores, sleeves, and/or liners could be insulated in accordance with this invention, assuming proper tolerances, etc.)

FIG. 5 depicts a combustion chamber 34 which is essentially completely bounded by engine components having an insulative composite 14 as heretofore described, as well as the piston 10 of FIG. 1B. An exhaust port 36 also includes the insulative composite 14, further enhancing engine efficiency. In addition, an intake valve 38 includes a composite 14 on its face 40. As a rule, the exhaust valve normally runs hot enough to render the addition of such an insulation composite unnecessary. Together, the components shown having insulation composites 14 form a fully insulated combustion space, wherein combustion occurs at higher temperatures, and thus power cycle efficiency is raised.

A method of making a composite layered cylinder head 35, which defines the combustion chamber 34 and exhaust port 36, is as described in the second preferred method of making a piston, utilizing the "upset" casting technique. Note that the preferred use of the "upset" casting technique as shown and described incorporates an aluminum component; thus in the present case, a cylinder head 35 of aluminum composition. Alternately, a cast iron cylinder head 35 may be cast, wherein no solder alloy is employed, as the cast iron forms a strong bond with the composite 14 without the use of an alloy. A preferred method of forming a cast iron cylinder head having a plurality of chambers involves simply the forming of mesh layers 20 into internal shapes of engine combustion chambers 34 and exhaust ports 36. Then, without requirements of special control temperatures or pressures as per the previously referenced method, molten cast iron is poured therearound to form a cylinder head 35. Next, the internal surface of the mesh layer 20 may be impregnated with ceramic adhesive (optional). Finally, a stainless steel layer 22 is applied by plasma spray to the exposed internal surface of the mesh layer 20.

Alternately, preformed stainless steal liners may be sintered initially to mesh layers 20, the layers having been formed into internal shapes of the latter chambers and ports 34 and 36, respectively. The molten cast iron is poured therearound to form a cast iron cylinder head 35. The cast iron bonds to the mesh without wicking into the mesh and filling the air spaces; thereby without damaging the insulation properties of the layers 20. In addition, the resilience of the mesh layers 20 allows for normal shrinkage of the cast iron during cooling without damage to the bond formed therebetween.

Figure 6:
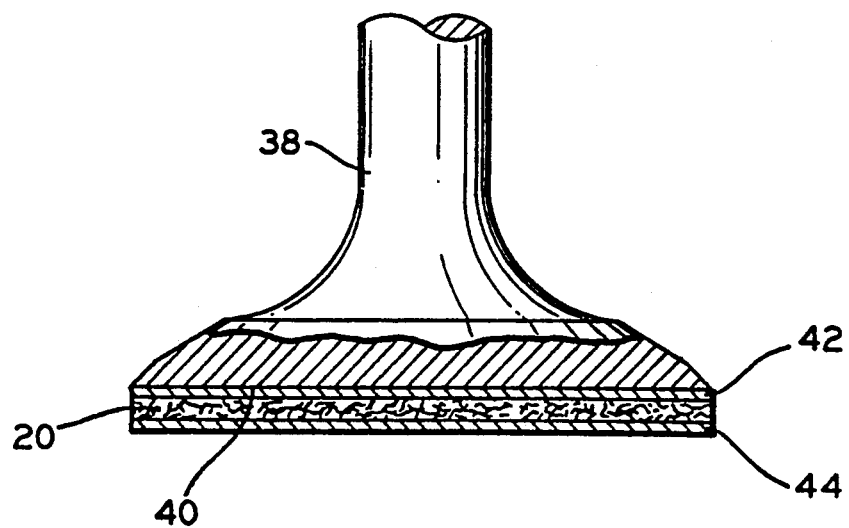
FIG. 6 is a view of an intake valve which incorporates the composite insulation layer of this invention on the face thereof.

Referring now to FIG. 6, intake valves 38 are generally fabricated of special high strength steels, but not of stainless. Although the wire mesh layer 20 can be brazed to aluminum via the solder alloy aforedescribed without the wicking of solder alloy into the mesh, attempts to braze the wire mesh to the steel valve 38 will result in wicking of the alloy. Nor can the wire mesh layer 20 be easily sintered to the valve without incurring some damage to the high strength character of the valve. Thus a preferred method of fabricating the valve 38 is to sandwich the stainless wire mesh layer 20 between two stainless sheet layers 42 and 44, and to sinter the resulting stainless steel members to opposite sides of the mesh layer 20. The sheet layer 42 adjacent the face of the steel valve 38 is then brazed by high temperature solder as, for example, nickel or silver solder to the face 40 of the valve 38 in a vacuum or nitrogen furnace.

Although the preferred embodiments of thermal insulation composites in accordance with this invention have been described in terms of stainless steel and wire mesh layers over substrate metals of aluminum and cast iron, other specific composition layers will be viewed as within the logical scope hereof. Thus stainless steel was employed as a specific example of a heat and corrosion resistant metal. To the extent that the metal must be able to withstand the rigors of combustion, an impact resistance character is preferred, so that the layer does not become brittle and subject to fatigue failure. Besides stainless steel, for example, several other alloys are appropriate, as those including tungsten, paladium, and certain nickle-chrome alloys. As a substitute for the wire mesh layer 20, other metallic insulation layers may be employed, as for example, metallic skeletal structure. An example of the latter is Duocel* material, a rigid, highly porous and permeable metallic structure with a controlled density of metal per unit volume, and which is available in many different metals.

The bonding agent for adhesion of the wire mesh layer 14 to the substrate metal of engine components has been described as a solder alloy, particularly a zinc aluminum alloy for an aluminum cast component, and a nickle or silver high temperature alloy for a high strength steel intake valve. The latter metallic bonding agents are suitable for in-place casting of the various engine components described (with exception of the valves, which are usually forged, not cast). An example of a non-metallic bonding agent for an insulation composite for use with an existing piston or combustion chamber is a high temperature, rubber-base adhesive, as for example, Plastilok* 601 film adhesive, used normally for bonding brake and clutch linings.

What is claimed is:

1. A method of casting a cylinder head having an internal surface therein comprising the steps of:
   (a) placing at least one formed internal metallic insulation layer into a mold, said layer having the shape of a cylinder head including combustion chamber and exhaust manifold portions;
   (b) introducing molten material into said mold;
   (c) allowing said molten material to solidify to form a cylinder head casting;
   (d) removing said solidified cylinder head casting having said formed metallic insulation layer included therewith; and
   (e) applying a stainless steel coating to the internal exposed portions of said formed metallic insulation layer.

2. The method of claim 1 further comprising the application of solder alloy to the external surfaces including any exposed sides of said formed metallic insulation layers prior to placement thereof into said mold.

3. The method of claim 1 further comprising the step of heating said formed metallic insulation layer to about 550° F. to 650° F. prior to introduction of said molten material.

4. The method of claim 1 wherein said stainless steel coating is applied to said metallic insulation layer via electrostatic means.

5. The method of claim 2 wherein said stainless steel coating is applied to said metallic insulation layer via electrostatic means.

6. The method of claim 3 wherein said stainless steel coating is applied to said metallic insulation layer via electrostatic means.

* * * * *